United States Patent
Kondo et al.

(10) Patent No.: US 10,094,671 B2
(45) Date of Patent: Oct. 9, 2018

(54) POSITION MEASUREMENT METHOD, OWN POSITION MEASUREMENT DEVICE, AND ON-BOARD UNIT

(71) Applicant: MITSUBISHI HEAVY INDUSTRIES MECHATRONICS SYSTEMS, LTD., Kobe-shi, Hyogo (JP)

(72) Inventors: Kazuumi Kondo, Tokyo (JP); Hideaki Murata, Tokyo (JP); Tetsuya Adachi, Tokyo (JP)

(73) Assignee: MITSUBISHI HEAVY INDUSTRIES MACHINERY SYSTEMS, LTD., Kobe-Shi, Hyogo (JP)

( * ) Notice: Subject to any disclaimer, the term of this patent is extended or adjusted under 35 U.S.C. 154(b) by 104 days.

(21) Appl. No.: 15/113,961

(22) PCT Filed: Jan. 27, 2015

(86) PCT No.: PCT/JP2015/052154
§ 371 (c)(1),
(2) Date: Jul. 25, 2016

(87) PCT Pub. No.: WO2015/115405
PCT Pub. Date: Aug. 6, 2015

(65) Prior Publication Data
US 2016/0341557 A1 Nov. 24, 2016

(30) Foreign Application Priority Data
Jan. 28, 2014 (JP) .................................. 2014-013248

(51) Int. Cl.
*G01C 21/28* (2006.01)
*G01S 19/48* (2010.01)
(Continued)

(52) U.S. Cl.
CPC ............. *G01C 21/30* (2013.01); *G01C 21/28* (2013.01); *G01C 21/3453* (2013.01);
(Continued)

(58) Field of Classification Search
CPC ........... G01S 13/931; G01S 2013/9353; G01S 11/06; G01S 11/10; G06K 9/00805; G06K 9/00812; G07C 5/008
See application file for complete search history.

(56) References Cited

U.S. PATENT DOCUMENTS 6,539,294 B1 * 3/2003 Kageyama .............. E02F 3/842
                                                             180/168
7,230,568 B2 * 6/2007 Rao .......................... G01S 19/29
                                                             342/357.68
(Continued)

FOREIGN PATENT DOCUMENTS

JP      H10-311734 A      11/1998
JP      2004-069536 A      3/2004
(Continued)

OTHER PUBLICATIONS

PCT/ISA/210, "International Search Report for International Application No. PCT/JP2015/052154,", Apr. 28, 2015.
(Continued)

*Primary Examiner* — Steven Lim
*Assistant Examiner* — Muhammad Adnan
(74) *Attorney, Agent, or Firm* — Manabu Kanesaka; Benjamin Hauptman; Kenneth M. Berner

(57) ABSTRACT

A vehicle position measurement method includes a process of determining whether or not position information of an own vehicle is able to be acquired with predetermined quality from the outside, a process of acquiring position information of a nearby vehicle present in an area in which the own vehicle is capable of acquiring information when (Continued)

the position information is determined not to be able to be acquired with the predetermined quality, and a process of replacing the position information of the own vehicle with the acquired position information of the nearby vehicle.

11 Claims, 7 Drawing Sheets

(51) Int. Cl.
*G01S 19/40* (2010.01)
*H04B 17/318* (2015.01)
*G01C 21/30* (2006.01)
*G01C 21/34* (2006.01)
*G01S 5/02* (2010.01)
*H04W 4/02* (2018.01)
*H04W 4/04* (2009.01)
*G07B 15/06* (2011.01)
*H04W 84/12* (2009.01)

(52) U.S. Cl.
CPC ............ *G01S 5/0289* (2013.01); *G01S 19/40* (2013.01); *G01S 19/48* (2013.01); *H04B 17/318* (2015.01); *H04W 4/023* (2013.01); *H04W 4/046* (2013.01); *G07B 15/06* (2013.01); *H04W 84/12* (2013.01)

(56) References Cited

U.S. PATENT DOCUMENTS

| | | | | |
|---|---|---|---|---|
| 7,636,632 B2* | 12/2009 | Wolterman | ............ | G01C 21/26 701/117 |
| 7,653,349 B1* | 1/2010 | Patel | .................... | H04H 20/426 342/457 |
| 8,531,333 B2* | 9/2013 | Leclercq | ................. | G01S 19/34 342/357.46 |
| 8,935,597 B2* | 1/2015 | Rao | ......................... | G06F 11/10 714/776 |
| 9,924,318 B2* | 3/2018 | Ghabra | ................ | H04B 1/3822 |
| 2005/0073430 A1* | 4/2005 | Kusters | .................... | B60Q 1/52 340/901 |
| 2005/0171683 A1* | 8/2005 | Irie | ........................ | G07C 5/008 701/117 |
| 2005/0222768 A1* | 10/2005 | Tauchi | ................... | G01C 21/26 701/469 |
| 2006/0149475 A1* | 7/2006 | Kellum | .................... | G01S 11/06 701/300 |
| 2006/0167633 A1* | 7/2006 | Satonaka | ............. | B62D 15/027 701/300 |
| 2008/0262722 A1* | 10/2008 | Haag | .................. | B60H 1/00771 701/412 |
| 2009/0063051 A1* | 3/2009 | Watanabe | ............ | G01C 21/165 701/472 |
| 2009/0102629 A1* | 4/2009 | Kaller | .................... | B60Q 9/008 340/435 |
| 2010/0198513 A1* | 8/2010 | Zeng | ...................... | B60W 40/02 701/300 |
| 2011/0060549 A1* | 3/2011 | Nielsen | .................. | G06Q 10/06 702/141 |
| 2013/0197800 A1* | 8/2013 | Haran | ..................... | G01S 19/40 701/445 |
| 2014/0195102 A1* | 7/2014 | Nathanson | ........... | G07C 5/0808 701/31.4 |
| 2014/0333479 A1* | 11/2014 | Steinhardt | ............... | G01S 19/22 342/357.67 |
| 2016/0063858 A1* | 3/2016 | Schmudderich | ...... | B60W 40/04 701/117 |
| 2017/0184726 A1* | 6/2017 | Lee | ......................... | G01S 19/51 |

FOREIGN PATENT DOCUMENTS

| | | | | |
|---|---|---|---|---|
| JP | 2004069536 A | * | 3/2004 | |
| JP | 2004-301725 A | | 10/2004 | |
| JP | 2004301725 A | * | 10/2004 | |
| JP | 2005-115637 A | | 4/2005 | |
| JP | 2007-178270 A | | 7/2007 | |
| JP | 2009-058242 A | | 3/2009 | |
| JP | 2009058242 A | * | 3/2009 | .......... G01C 21/165 |
| JP | 2009-257763 A | | 11/2009 | |
| JP | 2011-058909 A | | 3/2011 | |
| JP | 2011058909 A | * | 3/2011 | |
| JP | 2012-133644 A | | 7/2012 | |
| JP | 2013-101013 A | | 5/2013 | |
| WO | 2010/081544 A1 | | 7/2010 | |
| WO | WO 2012100154 A1 | * | 7/2012 | .......... H04W 64/003 |

OTHER PUBLICATIONS

PCT/ISA/237, "Written Opinion of the International Searching Authority for International Application No. PCT/JP2015/052154," dated Apr. 28, 2015.

* cited by examiner

| RELIABILITY LEVEL | CONTENT |
|---|---|
| 2 | GNSS + SENSOR |
| 1 | SENSOR |
| 0 | NONE |

POSITION MEASUREMENT METHOD, OWN POSITION MEASUREMENT DEVICE, AND ON-BOARD UNIT

TECHNICAL FIELD

The present invention relates to a position measurement method, an own position measurement device, and an on-board unit.

Priority is claimed on Japanese Patent Application No. 2014-013248, filed Jan. 28, 2014, the content of which is incorporated herein by reference.

BACKGROUND ART

In a road charging system, a scheme of recognizing that a vehicle passes through a charging point to perform charging through communication between a wireless communication device installed at each charging point and a wireless communication device provided in the vehicle passing through the point, or by reading, for example, a number plate of the vehicle with a camera installed on a roadside is widely used. Further, there is a position measurement method for a vehicle using a global navigation satellite system (GNSS), comparing information of the position with map information including information of a charging point to determine passage of the charging point and perform charging.

Further, in a next generation road charging system, a mechanism for estimating a position of a vehicle using a combination of position measurement using a GNSS and an autonomous position measurement method using an acceleration sensor or the like included in a vehicle and performing charging on the basis of, for example, a travel route of the vehicle or a stay time in a specific area has been examined. To realize this next-generation road charging system, it is necessary to recognize accurate position information of the vehicle. For example, Patent Literature 1 describes a method of receiving a signal from a quasi-zenith satellite using a receiver mounted on an on-board unit and measuring an accurate position of the vehicle.

CITATION LIST

Patent Literature

[Patent Literature 1]
Japanese Unexamined Patent Application, First Publication No. 2013-101013

SUMMARY OF INVENTION

Technical Problem

In the inside of a vehicle in which an on-board unit is installed, an environmental temperature is higher than that in general industrial products, and may be equal to or higher than 80° C. Further, facilities and devices of the vehicle are greatly influenced by vibration due to travel, or departure and stop of the vehicle. Further, in an on-board unit for a next generation road charging system, in order to obtain accurate position information, a configuration of devices becomes complicated and the number of components or modules greatly increases. Accordingly, in the next generation road charging system, a risk of failure of devices mounted on the vehicle increases.

If a device fails, for example, if a receiver that receives a signal from a satellite of GNSS fails, it is not possible to obtain accurate position information of the vehicle. Accordingly, it is not possible to perform appropriate charging.

The present invention provides a position measurement method, an own position measurement device, and an on-board unit capable of solving the above-described problems.

Solution to Problem

According to a first aspect of the present invention, a position measurement method for a vehicle includes a process of determining whether or not position information of an own vehicle is able to be acquired with predetermined quality from the outside; a process of acquiring position information of a nearby vehicle present in an area in which the own vehicle is capable of acquiring information when the position information is determined not to be able to be acquired with the predetermined quality; and a process of replacing the position information of the own vehicle with the acquired position information of the nearby vehicle.

According to a second aspect of the present invention includes acquiring a plurality of pieces of position information of nearby vehicles through communications, and calculating the position information of the own vehicle from the acquired position information and received signal strength indicators in the respective communications used for the acquisition.

According to a third aspect of the present invention, in the position measurement method, the process of acquiring the position information of the nearby vehicles includes a process of further acquiring information indicating reliability of the position information, and selecting position information having a reliability equal to or higher than that of the own vehicle from the position information of the nearby vehicles when the position information of the own vehicle is determined not to be able to be acquired with the predetermined quality.

According to a fourth aspect of the present invention, in the position measurement method, the process of acquiring the position information of the nearby vehicles includes a process of further acquiring information indicating reliability of the position information, and weighting the position information of the own vehicle and the nearby vehicles, calculating the position information, and replacing the position information of the own vehicle with the calculated position information when the position information of the own vehicle is determined not to be able to be acquired with the predetermined quality.

According to a fifth aspect of the present invention, a determination of the quality is performed according to whether or not there is communication abnormality in the acquisition of the position information from the outside.

According to a sixth aspect of the present invention, a determination of the quality is performed according to whether or not data acquired from the outside is abnormal.

According to a seventh aspect of the present invention, a determination of the quality is performed according to whether or not a position indicated by position information recorded at the time of engine stop of the own vehicle and a position indicated by the position information estimated at the time of engine start-up deviate by a predetermined value or greater.

According to an eighth aspect of the present invention, a determination of the quality is performed according to whether or not a position of the own vehicle estimated on the basis of the position information acquired from the outside and a position of the own vehicle estimated from the acquired position information of the nearby vehicles deviate by a predetermined value or greater through a comparison between the positions.

According to a ninth aspect of the present invention, a determination of the quality is performed according to whether or not displacement of position information of the own vehicle acquired from the outside at a predetermined time and displacement measured by a sensor included in the own vehicle at the predetermined time deviate by a predetermined value or greater.

According to a tenth aspect of the present invention, an own position measurement device includes a failure monitoring unit that determines whether or not position information of an own vehicle is able to be acquired with predetermined quality from the outside; a nearby vehicle position acquisition unit that acquires position information of a nearby vehicle present in an area in which the own vehicle is capable of acquiring information when the position information is determined not to be able to be acquired with the predetermined quality; and a position estimation processing unit that estimates the position information of the own vehicle from the acquired position information of the nearby vehicle.

According to an eleventh aspect of the present invention, in the own position measurement device, the nearby vehicle position acquisition unit includes a radio wave intensity and position calculation unit that acquires a plurality of pieces of position information of nearby vehicles through communication, and calculates the position information of the own vehicle from the plurality of pieces of acquired position information and received signal strength indicators in the respective communications used for the acquisition.

According to a twelfth aspect of the present invention, the own vehicle position measurement device includes a reliability level check unit that acquires information indicating reliability of the position information of the nearby vehicles, and selects position information having a reliability equal to or higher than that of the own vehicle from the position information of the nearby vehicles.

According to a thirteenth aspect of the present invention, the reliability level check unit acquires a weight according to a reliability level, applies the weight to the position information of the own vehicle and the nearby vehicles, and calculates the position information.

According to a fourteenth aspect of the present invention, the failure monitoring unit performs a determination of the quality according to whether or not there is a communication abnormality in the acquisition of the position information from the outside.

According to a fifteenth aspect of the present invention, the failure monitoring unit performs a determination of the quality according to whether or not data acquired from the outside is abnormal.

According to a sixteenth aspect of the present invention, the failure monitoring unit performs a determination of the quality according to whether or not a position indicated by position information recorded at the time of engine stop of the own vehicle and a position indicated by the position information estimated at the time of engine start-up deviate by a predetermined value or greater.

According to a seventeenth aspect of the present invention, the failure monitoring unit performs a determination of the quality according to whether or not a position of the own vehicle estimated on the basis of the position information acquired from the outside and a position of the own vehicle estimated from the acquired position information of the nearby vehicles deviate by a predetermined value or greater through a comparison between the positions.

According to an eighteenth aspect of the present invention, the failure monitoring unit performs a determination of the quality according to whether or not displacement of position information of the own vehicle acquired from the outside at a predetermined time and displacement measured by a sensor included in the own vehicle at the predetermined time deviate by a predetermined value or greater.

According to a nineteenth aspect of the present invention, an on-board unit includes an own position measurement device that measures a current position of an own vehicle using any one of the position measurement methods described above.

Advantageous Effects of Invention

According to the position measurement method, the own position measurement device, and the on-board unit, it is possible to measure a position of a vehicle even if a component of an on-board unit fails.

DESCRIPTION OF EMBODIMENTS

First Embodiment

Hereinafter, a position measurement method for a vehicle according to a first embodiment of the present invention will be described with reference to FIGS. 1 to 3.

Figure 1:
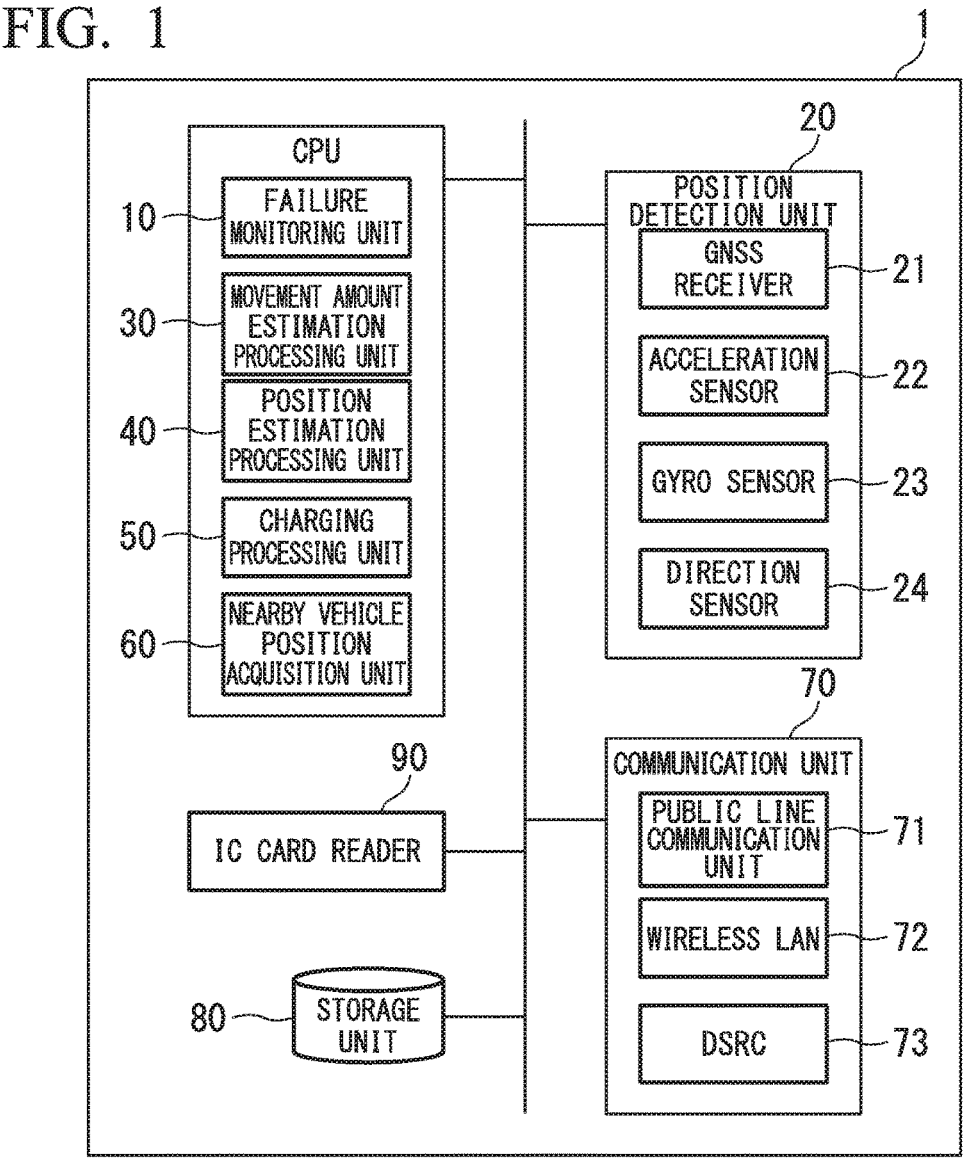
FIG. 1 is a functional block diagram of an own position measurement device according to a first embodiment of the present invention.

FIG. 1 is a functional block diagram of an own position measurement device in the first embodiment.

The own position measurement device 1 of this embodiment includes a failure monitoring unit 10, a position detection unit 20, a movement amount estimation processing unit 30, a position estimation processing unit 40, a charging processing unit 50, a nearby vehicle position acquisition unit 60, a communication unit 70, a storage unit 80, and an IC card reader 90, as shown in FIG. 1.

The failure monitoring unit 10 determines whether or not the position detection unit 20 is abnormal on the basis of whether position information of the own vehicle is acquired with predetermined quality from the outside, and instructs the nearby vehicle position acquisition unit 60 to perform tentative position detection when the position detection unit 20 is abnormal. More specifically, the outside is an artificial satellite of GNSS, and the failure monitoring unit 10 determines whether a GNSS receiver 21 can receive a signal from the satellite normally.

The position detection unit 20 acquires information necessary to estimate the position information of the own vehicle using various sensors. The position detection unit 20 includes a GNSS receiver 21, an acceleration sensor 22, a gyro sensor 23, and an orientation sensor 24.

The GNSS receiver 21 receives a signal including the position information transmitted from the artificial satellite of the GNSS, and outputs the position information to the position estimation processing unit 40.

The acceleration sensor 22 detects acceleration of the vehicle, and outputs the acceleration to the movement amount estimation processing unit 30.

The gyro sensor 23 detects an angular velocity of the vehicle, and outputs the angular velocity to the movement amount estimation processing unit 30.

The orientation sensor 24 detects an orientation of a travel direction of the vehicle, and outputs the direction to the movement amount estimation processing unit 30.

Position measurement using the GNSS receiver 21 is not always effective. For example, a signal often cannot be received in the inside of a tunnel or underground, and in a street with high-rise buildings, a signal is reflected by the high-rise buildings and a position measurement error easily occurs. Meanwhile, the acceleration sensor 22 or the like does not require an external signal, but errors tend to accumulate easily when the information acquired from the acceleration sensor 22 or the like is integrated and a position is estimated. In this embodiment, a current position of the vehicle is estimated in combination with a position information obtained by the GNSS and a method of calculating the amount of movement from an immediately previous position using position information acquired by other sensors, accumulating the amount of movement, and estimating the current position.

The movement amount estimation processing unit 30 calculates the amount of movement such as a travel distance or a travel direction of the vehicle in a predetermined period on the basis of information such as the acceleration or the angular velocity regularly acquired from the respective sensors.

The position estimation processing unit 40 adds the movement amount calculated by the movement amount estimation processing unit 30 to the position information obtained by the GNSS acquired from the GNSS receiver 21 to estimate the current position of the own vehicle, and outputs the position information to the charging processing unit 50.

The charging processing unit 50 specifies a travel route of the vehicle on the basis of the position information calculated by the position estimation processing unit 40, and compares the map information including information of an area which is a charging point or a charging target with the travel route to calculate a charging amount using a predetermined method.

The nearby vehicle position acquisition unit 60 acquires the position information of nearby vehicles using a wireless communication means when the failure monitoring unit 10 detects abnormality or failure of the position detection unit 20.

The communication unit 70 performs data communication between the own vehicle and another device. The communication unit 70 includes a public line communication unit 71, a wireless LAN 72, and a dedicated short range communication (DSRC) 73.

The public line communication unit 71 is, for example, a mobile phone, and transmits charging information calculated by the charging processing unit 50 to a management center of the road charging system over a mobile telephone network or receives, for example, a charging table or map information from the management center.

The wireless LAN 72 is a communication means based on a wireless LAN. When the failure monitoring unit 10 detects abnormality of the position detection unit 20, the wireless LAN 72 is used for the nearby vehicle position acquisition unit 60 to inquire of the nearby vehicle about the position information and acquire the position information from a nearby vehicle.

The DSRC 73 is a communication means based on a DSRC scheme. The DSRC 73 communicates with an antenna installed at a roadside of the charging point in a DSRC scheme to receive, for example, identification information of a place at which the antenna is installed. The information received by the DSRC 73 is transmitted to, for example, a management center of the road charging system via the public line communication unit 71, and the charging process is performed. In the road charging system of this embodiment, not only charging based on the position information using a GNSS and a sensor, but also charging using a DSRC is performed.

The storage unit 80 stores, for example, the map information or the charging table received from the management center.

The IC card reader 90 is an IC card reader mounted on the own position measurement device. The IC card reader 90 performs a read and write process and a security process such as an authentication process for an IC card for charging.

The failure monitoring unit 10, the movement amount estimation processing unit 30, the position estimation processing unit 40, the charging processing unit 50, and the nearby vehicle position acquisition unit 60 are a function that is included by a central processing unit (CPU) included in the own position measurement device 1 executing a program.

Figure 2:
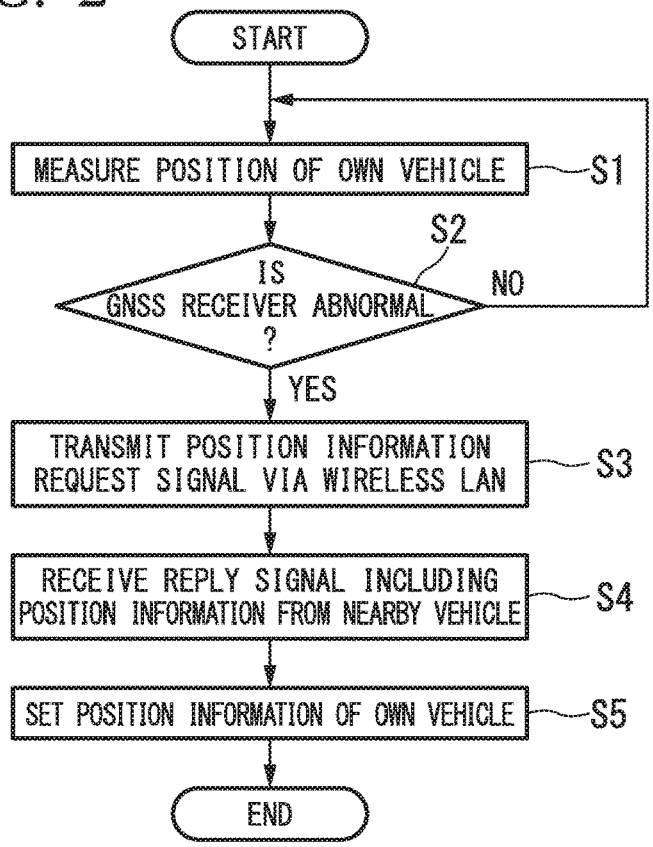
FIG. 2 is a process flow diagram of a position measurement method for an own vehicle according to the first embodiment of the present invention.

FIG. 2 is a process flow diagram of a position measurement method for an own vehicle according to the first embodiment of the present invention.

Figure 3:
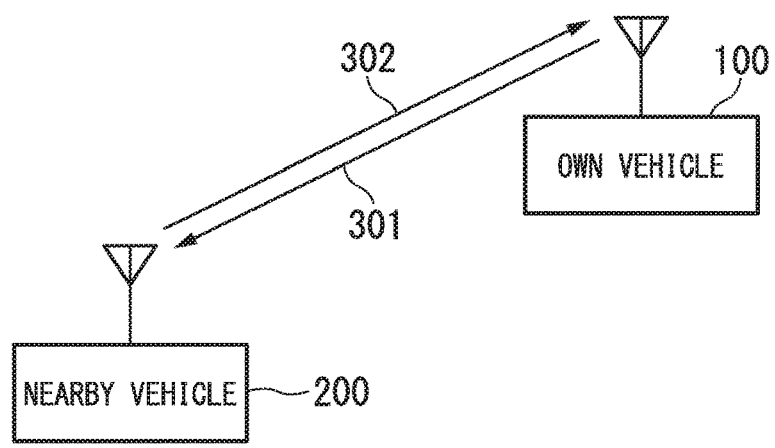
FIG. 3 is a diagram showing the position measurement method for an own vehicle according to the first embodiment of the present invention.

FIG. 3 is a diagram showing a position measurement method for an own vehicle according to the first embodiment of the present invention.

A position measurement method for an own vehicle according to this embodiment will be described with reference to FIGS. 2 and 3.

A nearby vehicle 200 is assumed to travel or stop near the own vehicle 100, as shown in FIG. 3.

First, the own vehicle 100 starts position measurement of a current position through a predetermined operation in the own vehicle 100 (step S1). For example, when the GNSS receiver 21 can receive a good signal from a satellite, the position estimation processing unit 40 may acquire the position information that the GNSS receiver 21 has received from the satellite at predetermined time intervals, and estimate the position information as position information at a current position of the own vehicle 100.

Further, when the own vehicle 100 is traveling in an area in which the GNSS receiver 21 cannot receive the signal from the satellite, the movement amount estimation processing unit 30 calculates the amount of movement from a position at which the signal was last received from the satellite using a known technology, and the position estimation processing unit 40 may add the movement amount to the position information last received from the satellite and estimate the resultant position information as current position information of the vehicle 100. Further, when the own vehicle 100 passes through the point at which a roadside antenna is installed, the position estimation processing unit 40 refers to map information including antenna position information stored in the storage unit 80 using identification information of the antenna that the DSRC 73 has obtained through wireless communication, and adds the position information of the passage point specified in the map information to the position information obtained by other means to estimate the current position of the own vehicle 100.

Then, the failure monitoring unit 10 determines whether or not the GNSS receiver 21 is abnormal on the basis of the quality of the position information acquired by the GNSS receiver 21 (step S2). For example, if the data received by the GNSS receiver 21 is abnormal, the failure monitoring unit 10 may determine that the quality of the position information is poor and the GNSS receiver 21 is abnormal. Further, the failure monitoring unit 10 may determine that the GNSS receiver 21 is abnormal if communication is abnormal upon receipt of the signal in the GNSS receiver 21. The communication abnormality refers to, for example, a case in which the GNSS receiver 21 cannot receive a signal for a predetermined time. A method of determining whether the GNSS receiver 21 is abnormal on the basis of the communication abnormality, for example, may be performed as follows. Quality prediction information indicating prediction of the quality of a signal which can be received from the satellite is added to the map information stored in the storage unit 80, and the failure monitoring unit 10 reads the quality prediction information at a current estimation position from the storage unit 80. The failure monitoring unit 10 performs a determination as to abnormality of the GNSS receiver 21 based on the communication abnormality only when the quality prediction information can be determined to be better than a predetermined reference. Further, for example, quality prediction information indicating that the quality of the received signal is poor is added to a position indicating a tunnel in the map information, and the current position estimated on the basis of the position information previously received from the GNSS by the position estimation processing unit 40 and a subsequent movement amount calculated by the movement amount estimation processing unit 30 indicates that it is the tunnel. In this case, the failure monitoring unit 10 may read the quality prediction information of the current position added to the map information from the storage unit 80 using the estimated current position, compare a predetermined reference value with the quality prediction information, and not determine that the GNSS receiver 21 is abnormal even when a signal cannot be received for a predetermined time by the GNSS receiver 21 if the predicted quality of the received signal at the current position can be determined to be poor.

Further, when an engine stops, the position estimation processing unit 40 records an estimated position at that time in the storage unit 80, and the current position estimated by the current position estimation processing unit 40 when the engine starts again and the position recorded when the engine stops deviate from each other by a predetermined distance or greater, the failure monitoring unit 10 may determine that the quality of the position information is poor and the GNSS receiver 21 is abnormal. Further, if a deviation of a predetermined distance or longer between displacement between position information based on a currently received signal and, for example, position information previously received from the satellite, and displacement in the meantime calculated by the movement amount estimation processing unit 30 occurs a predetermined number of times or more within a predetermined period, the failure monitoring unit 10 may determine that the quality of the position information is poor and the GNSS receiver 21 is abnormal.

If the failure monitoring unit 10 does not detect the abnormality of the GNSS receiver 21 (step S2=No), the failure monitoring unit 10 repeats the position measurement in step S1.

When the abnormality of the GNSS receiver 21 is detected (step S2=Yes), the failure monitoring unit 10 outputs an instruction signal for instructing to perform tentative position measurement to the nearby vehicle position acquisition unit 60.

If the nearby vehicle position acquisition unit 60 acquires this instruction signal, the nearby vehicle position acquisition unit 60 transmits a position information request signal 301 via the wireless LAN 72 (step S3). Then, the nearby vehicle 200 present within an area in which information can be acquired receives the position information request signal transmitted by the own vehicle 100. The nearby vehicle 200 receiving the signal includes a means for estimating a current position, similar to the own vehicle 100, and transmits a reply signal 302 including current estimated position information of the nearby vehicle 200 estimated by this means to the own vehicle 100. Alternatively, if the nearby vehicle 200 receives the position information request signal 301 from the own vehicle 100, the nearby vehicle 200 may re-receive latest position information from the satellite and transmit a reply signal 302 to the own vehicle 100. The own vehicle 100 receives the reply signal 302 including position information as a response to the position information request signal from the nearby vehicle 200 over the wireless LAN 72 (step S4). The nearby vehicle position acquisition unit 60 acquires the position information and records the position information in the storage unit 80 in place of the position information of the own vehicle that the GNSS receiver 21 has received from the satellite (step S5). Then, as in the current position estimating method at normal times, the position estimation processing unit 40 adds the amount of movement calculated by the movement amount estimation processing unit 30 to the position information recorded by the nearby vehicle position acquisition unit 60 to estimate the current position of the own vehicle 100.

Then, the processing flow ends.

According to this embodiment, it is possible to estimate the position of the own vehicle from the position information that the nearby vehicle has even when the GNSS receiver 21 fails due to a high temperature or vibration. Accordingly, it is possible to perform a charging process even when the GNSS receiver fails.

Modification Example

In Step S2 of the process flow of FIG. 2, the following determination method may also be considered. The failure monitoring unit 10 regularly acquires the position information from the nearby vehicle 200 via the wireless LAN 72. The failure monitoring unit 10 compares the acquired position information with the position information estimated by the position estimation processing unit 40. If the position information deviates by a predetermined distance or longer, the failure monitoring unit 10 determines that the GNSS receiver 21 is abnormal. Since the case in which a GNSS receiver mounted on an opponent vehicle fails is also considered if the number of nearby vehicles 200 is one, it is preferable to acquire the position information from a plurality of nearby vehicles 200. By all vehicles adopting a scheme of confirming the accuracy of the position information of the own vehicle 100 by referring to the position information obtained from a plurality of nearby vehicles 200, effects of preventing imbalance of the charging amount between the vehicles due to a position measurement error for any cause can also be expected.

Further, although the deviation between position measurement results at the time of the engine stop of the own vehicle 100 and the time of subsequent start-up is a reference for a failure determination in the description of FIG. 2, for example, the position estimation processing unit 40 continues to measure the current position while the vehicle is stopped with a parking brake engaged, and when a variation of the current position is confirmed, the failure can be determined. Similarly, when a variation of the current position calculated by the position estimation processing unit 40 has been confirmed in a state there is no change in an output value of the acceleration sensor or the gyro sensor, failure can be determined.

Second Embodiment

Hereinafter, a position measurement method for a vehicle according to a second embodiment of the present invention will be described with reference to FIGS. 4 to 6.

Figure 4:
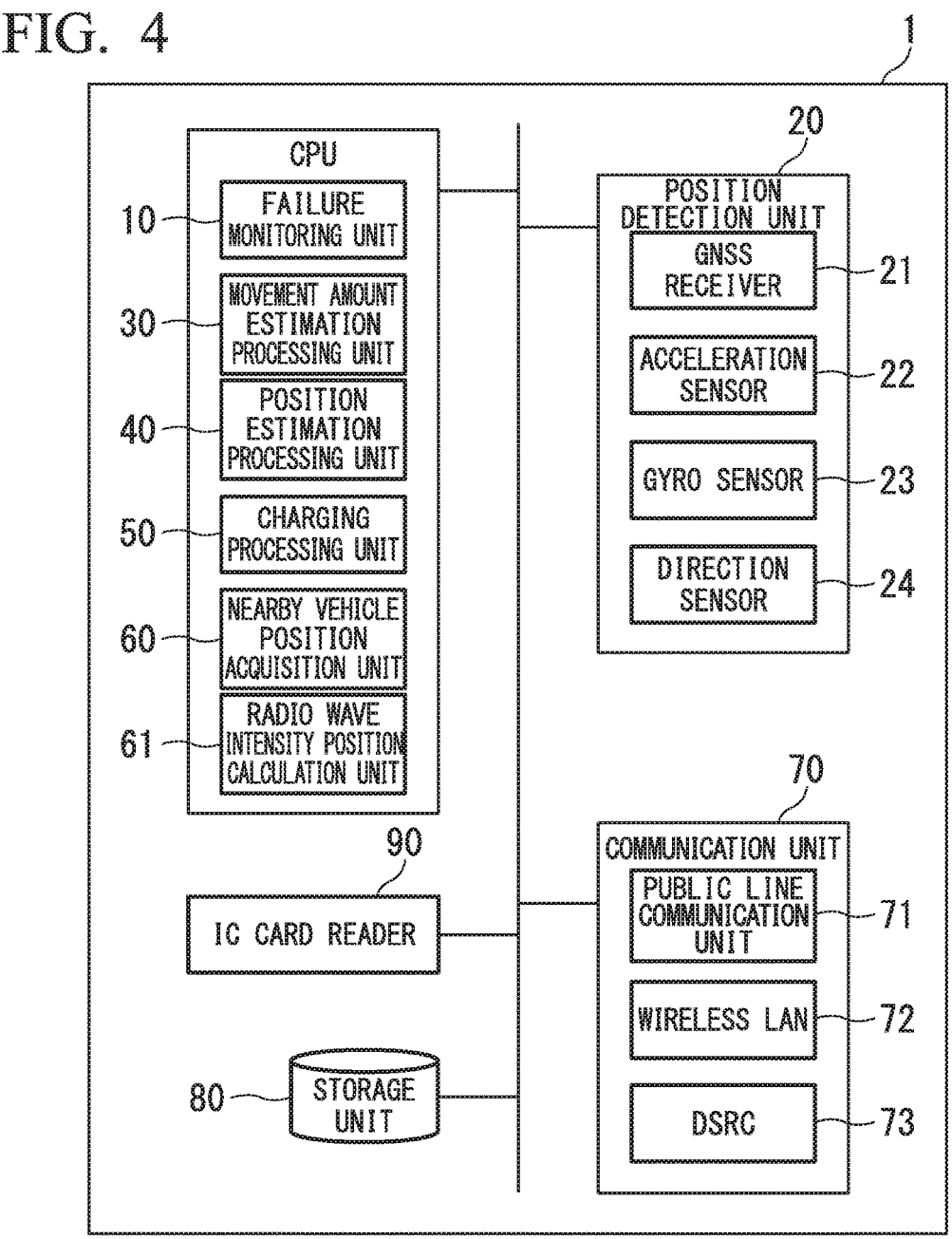
FIG. 4 is a functional block diagram of an own position measurement device according to a second embodiment of the present invention.

FIG. 4 is a functional block diagram of an own position measurement device according to the second embodiment. As shown in FIG. 4, the own position measurement device 1 according to this embodiment includes a radio wave intensity and position calculation unit 61, and other configurations are the same as those in the first embodiment.

The radio wave intensity and position calculation unit 61 of this embodiment calculates the current position of the own vehicle 100 using position information of each of a plurality of nearby vehicles 200 included in reply signals received from the plurality of nearby vehicles 200 and received signal strength indicators of the reply signals. The radio wave intensity and position calculation unit 61 is a function that is included by a CPU included in the own position measurement device 1 executing a program.

Figure 5:
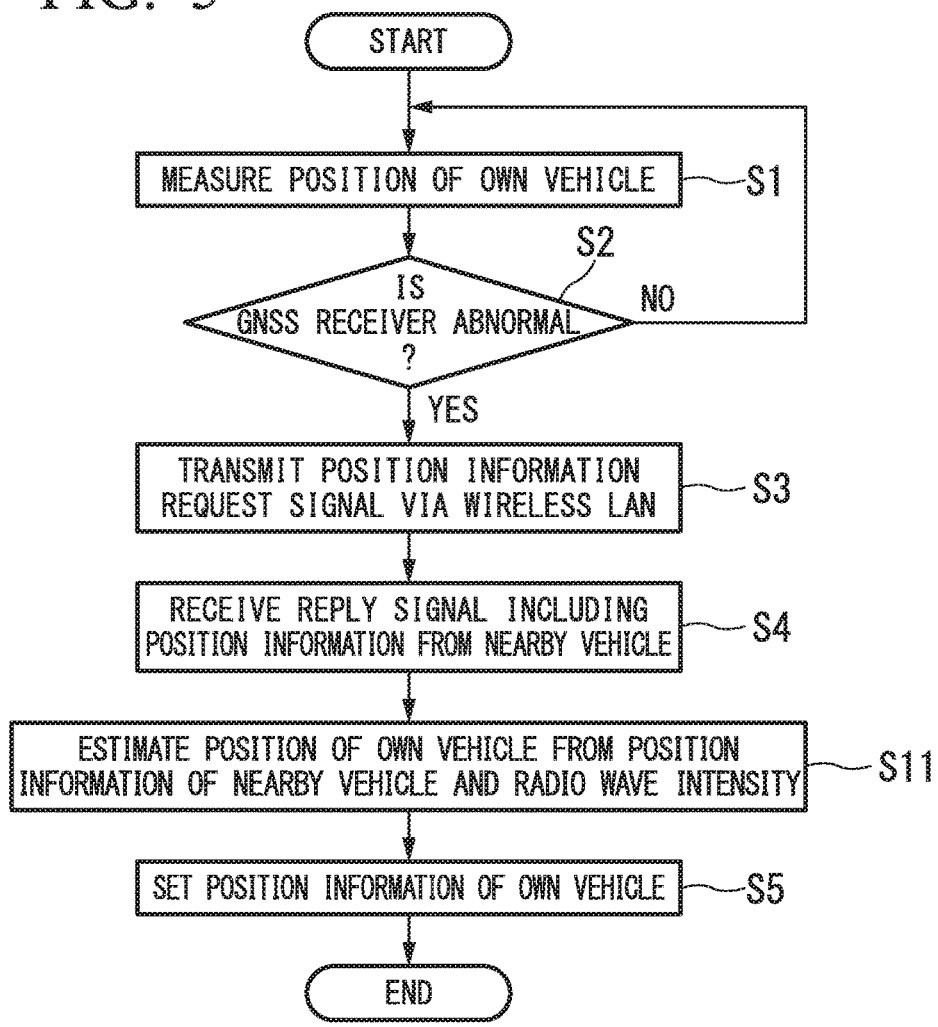
FIG. 5 is a process flow diagram of a position measurement method for an own vehicle in the second embodiment of the present invention.

FIG. 5 is a process flow diagram of a position measurement method for an own vehicle in the second embodiment of the present invention.

Figure 6:
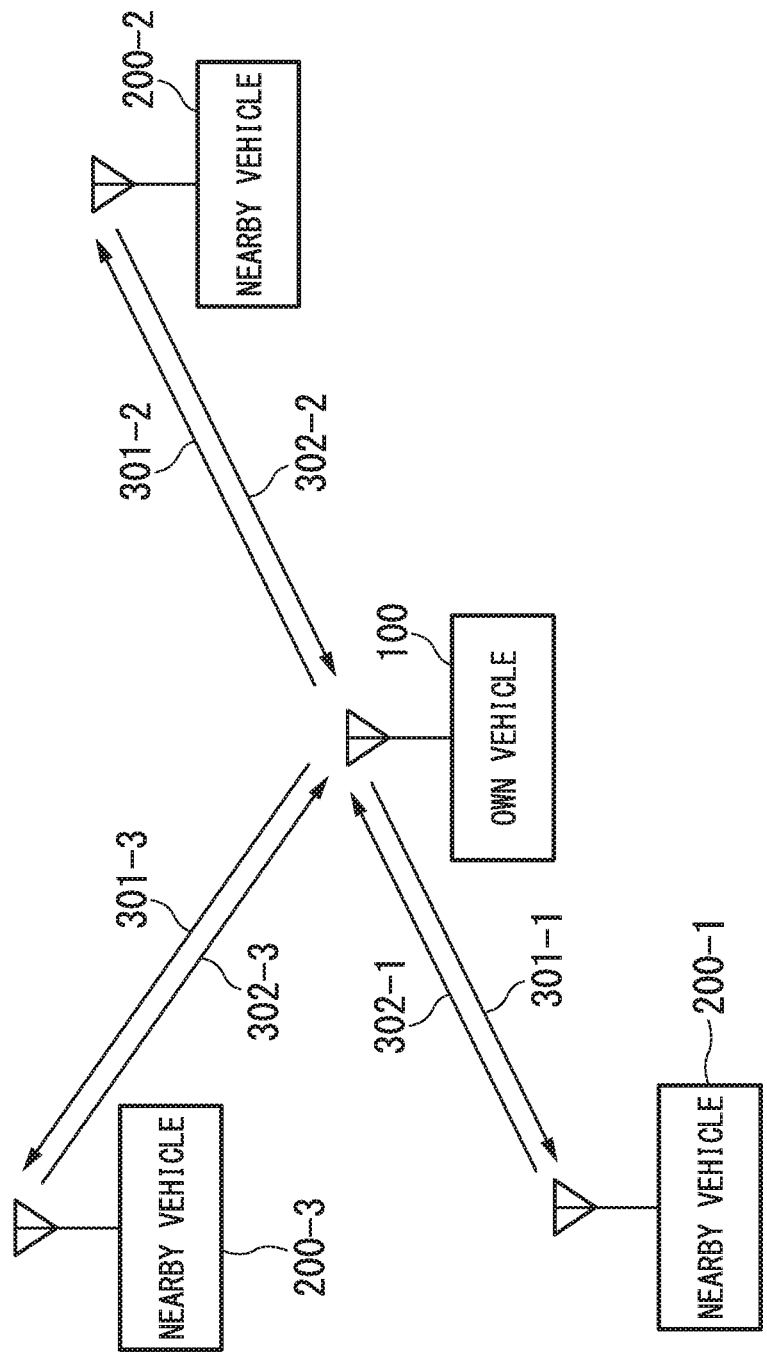
FIG. 6 is a diagram showing the position measurement method for an own vehicle according to the second embodiment of the present invention.

FIG. 6 is a diagram showing the position measurement method for an own vehicle in the second embodiment of the present invention.

The position measurement method for an own vehicle according to this embodiment will be described with reference to FIGS. 5 and 6.

First, steps S1 to S3 are the same as those in the first embodiment. That is, if the failure monitoring unit 10 determines that the GNSS receiver 21 is abnormal, the nearby vehicle position acquisition unit 60 transmits position information request signals 301-1, 301-2, and 301-3.

Then, in step S4, the own vehicle 100 receives reply signals 302-1, 302-2, and 302-3 including position information from at least three nearby vehicles 200-1, 200-2, and 200-3. In this case, in this embodiment, the nearby vehicle position acquisition unit 60 outputs the reply signal received through the wireless LAN 72 to the radio wave intensity and position calculation unit 61. Further, the radio wave intensity and position calculation unit 61 acquires the radio wave intensity of the reply signals 302-1, 302-2, and 302-3 received from the respective nearby vehicles 200 detected by the wireless LAN 72 from the wireless LAN 72, in addition to the position information. The radio wave intensity and position calculation unit 61 estimates a current position of the own vehicle 100 from the acquired position information and radio wave intensity using triangulation or the like (step S11).

A method of estimating the current position may be, for example, the following method. First, a table defining a relationship between the radio wave intensity of the wireless LAN and a distance from an opponent vehicle when the reply signal is received at the radio wave intensity is stored in the storage unit 80 in advance. The radio wave intensity and position calculation unit 61 reads distance information corresponding to each of the acquired radio signal strengths from this table. Then, the radio wave intensity and position calculation unit 61 obtains an intersection of all of circles when circles having a length indicated by the read distance information as a radius are drawn around a position indicated by the position information acquired from the nearby vehicles 200-1, 200-2, and 200-3, and estimates the intersection as the current position of the own vehicle 100. For example, when all the circles do not intersect at one point, the current position may be estimated using a predetermined method. For example, a centroid of a polygon connecting the intersections of the plurality of circles is estimated as the current position of the own vehicle 100.

If the radio wave intensity and position calculation unit 61, for example, estimates the current position of the own vehicle 100 using the above-described method, the radio wave intensity and position calculation unit 61 outputs the position information to the nearby vehicle position acquisition unit 60, and the nearby vehicle position acquisition unit 60 records the position information in the storage unit 80 in place of the position information that the GNSS receiver 21 has received from the satellite (step S5). Thereafter, the position measurement method is the same as that in the first embodiment.

Thus ends the processing flow.

According to this embodiment, more accurate position measurement can be performed by estimating the current position of the own vehicle using the a plurality of pieces of position information of nearby vehicles. Accordingly, it is possible to perform a charging process on the basis of a more accurate travel route or stay position information of the vehicle even when the GNSS receiver fails.

Third Embodiment

Hereinafter, a position measurement method for a vehicle according to a third embodiment of the present invention will be described with reference to FIGS. 7 to 9. A configuration characteristic in this embodiment will be described using an example in which the third embodiment is combined with the second embodiment, although the third embodiment could also be combined with the first embodiment.

Figure 7:
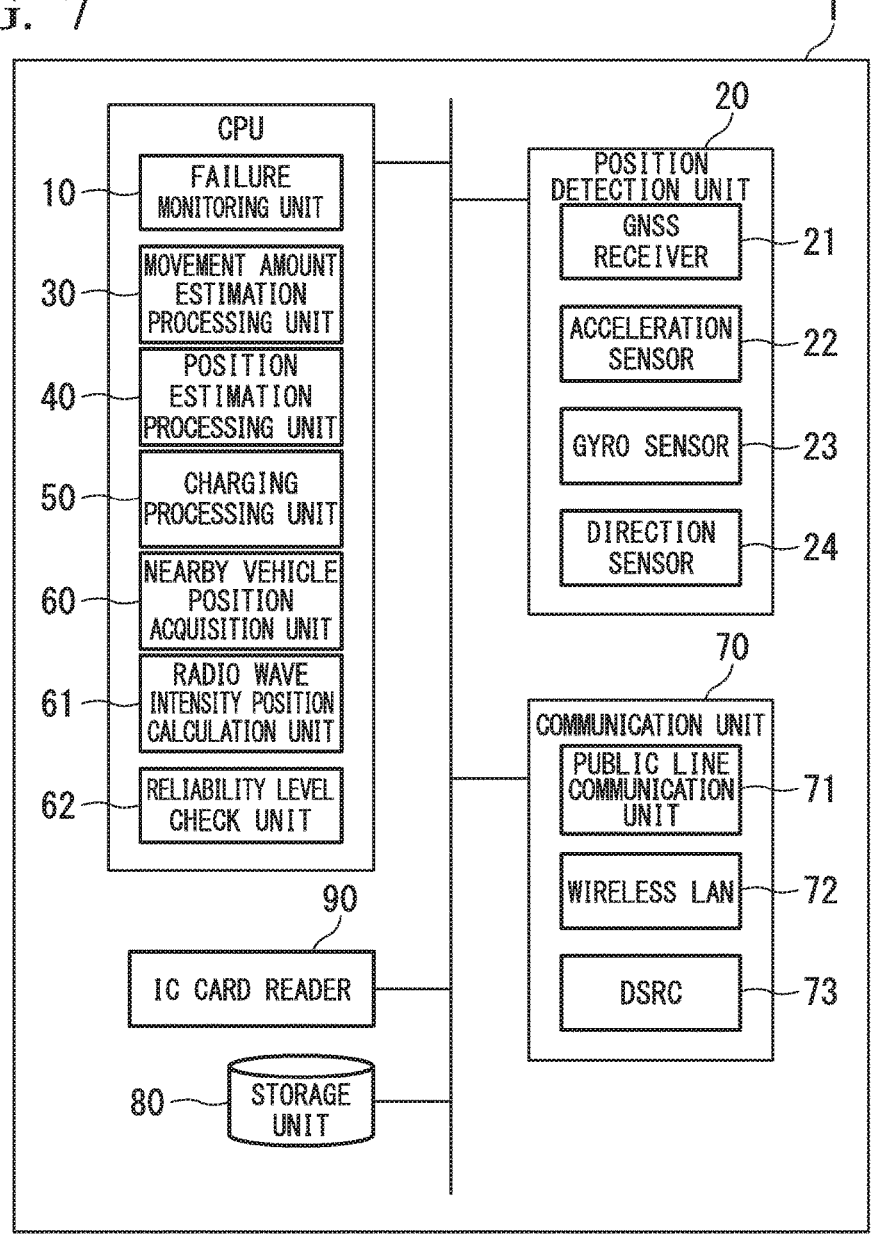
FIG. 7 is a functional block diagram of an own position measurement device in a third embodiment of the present invention.

FIG. 7 is a functional block diagram of an own position measurement device according to the third embodiment. As shown in FIG. 7, the own position measurement device 1 according to this embodiment includes a reliability level check unit 62, and other configurations are the same as those in the second embodiment.

The reliability level check unit 62 of this embodiment evaluates reliability of the position information received from the nearby vehicle 200 according to the reliability level information included in the reply signal. For example, the reliability level check unit 62 compares the reliability level of position measurement in the own vehicle 100 when the failure monitoring unit 10 of the own vehicle 100 detects no abnormality with the reliability level acquired from the nearby vehicle 200. The reliability level check unit 62 adopts, as the position information of the own vehicle, a position estimated using the position information acquired from the nearby vehicle 200 and the received signal strength indicators only when the reliability level acquired from nearby vehicle 200 is equal to or higher than the reliability level of the own vehicle. The reliability level check unit 62 is a function that is included by a CPU included in the own position measurement device 1 executing a program.

Figures 8, 9:
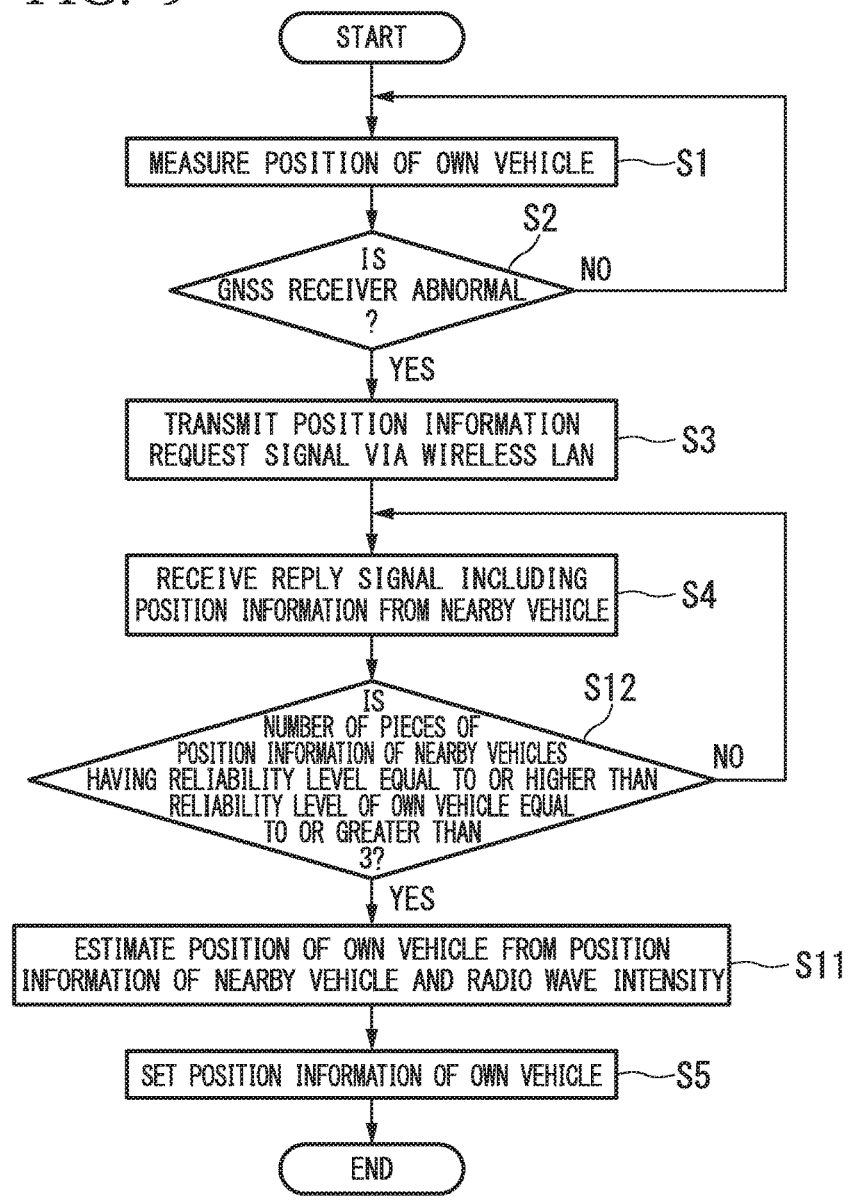
FIG. 8 is an example of a position information reliability level table used in the third embodiment of the present invention.
FIG. 9 is a process flow diagram of a position measurement method for an own vehicle in the third embodiment of the present invention.

FIG. 8 shows an example of a position information reliability level table that is used in the third embodiment of the present invention.

The reliability level of the position information that is used in this embodiment will be described with reference to FIG. 8. A value of a "reliability level" column of the table shown in FIG. 8 indicates a reliability of own position information transmitted by each nearby vehicle 200. A greater value indicates higher reliability. Each nearby vehicle 200 transmits a reliability level of the own position information to the own vehicle 100 together with the own position information. A value of a "content" column describes a measurement technology corresponding to the reliability level. In the example of FIG. 8, in a method of performing position measurement by combining the position information obtained by signal reception from the GNSS with a movement amount based on the basis of the measured value in an acceleration sensor or a gyro sensor, the reliability is highest when the reliability level is "2." Further, for example, when the GNSS receiver 21 is not included and position measurement is performed with only a value measured by an autonomous sensor such as an acceleration sensor, the reliability level is "1." For example, when the GNSS receiver 21 is included but fails and position measurement is performed with only a DSRC, an acceleration sensor, or the like, the reliability level is "1." Further, when neither the GNSS receiver 21 nor the sensor is included, the reliability level of the position information that can be acquired from the vehicle is "0." The position information based on the vehicle of which the reliability level is "0" may be considered to be, for example, position information that the vehicle has regularly acquired from the other nearby vehicle 200 over a wireless LAN.

In this embodiment, the reliability level check unit 62 of the own vehicle 100 reads the table shown in FIG. 8 from the storage unit 80, evaluates the reliability level information acquired from the nearby vehicle 200 on the basis of the table, and determines the position information acquired from the nearby vehicle 200 to be used to estimate the position of the own vehicle 100.

FIG. 9 is a process flow diagram of a position measurement method for an own vehicle in a third embodiment of the present invention.

The position measurement method for an own vehicle 100 in this embodiment will be described with reference to FIG. 9.

First, steps S1 to S3 are the same as those in the second embodiment. That is, if the failure monitoring unit 10 determines that the GNSS receiver 21 is abnormal, the nearby vehicle position acquisition unit 60 transmits a position information request signal. In step S4, the radio wave intensity and position calculation unit 61 acquires a reply signal from three or more nearby vehicles 200 and a radio wave intensity over the wireless LAN 72. In this embodiment, the reliability level information is included in the reply signal, in addition to the position information of each vehicle or the like, and the radio wave intensity and position calculation unit 61 outputs the position information, the radio wave intensity, and the reliability level included in the acquired reply signal to the reliability level check unit 62 (step S4). Then, the reliability level check unit 62 reads the reliability level information of the own vehicle 100 from the storage unit 80, and compares the reliability level of the own vehicle 100 with the acquired reliability levels of all nearby vehicles 200. The reliability level check unit 62 selects the position information of which the reliability level is equal to or higher than the reliability level of the own vehicle 100. If the number of pieces of the selected information is equal to or greater than 3 (step S12=Yes), the reliability level check unit 62 outputs position information including the selected position information and the radio wave intensity to the radio wave intensity and position calculation unit 61.

The radio wave intensity and position calculation unit 61 calculates the position information of the own vehicle 100, similar to the second embodiment (step S11), and the nearby vehicle position acquisition unit 60 records the position information as the position information of the own vehicle 100 in the storage unit 80 in place of the position information that the GNSS receiver 21 has received from the satellite (step S5).

On the other hand, if the number of pieces of the position information including the reliability level equal to or higher than the reliability level of the own vehicle 100 is smaller than 3 (step S12=No), the reliability level check unit 62 outputs an error signal to the nearby vehicle position acquisition unit 60, and repeats the process from step S4.

Thus ends the process flow.

According to this embodiment, it is possible to exclude the position information of the nearby vehicle of which the reliability is low from the calculation. Accordingly, it becomes possible to perform a charging process on the basis of accurate position information.

Although the above-described method may be used, for example, when the reply signal can be received from a large number of nearby vehicles 200, a case in which a reply signal is not obtained from the nearby vehicle 200 including a position measurement means having a desired reliability level or higher, such as a case in which the number of traveling vehicles is small, may be considered. In such a case, even when the reliability level is low, the current position of the own vehicle 100 may be estimated using the position information.

For example, the table shown in FIG. 8 may include weighting information for each reliability level, and the reliability level check unit 62 may perform the calculation of the position information in consideration of a weight in step S11 instead of performing the comparison with the reliability level of the position measurement means included in the own vehicle 100 in step S12 of the process flow of FIG. 9.

As an example, a "weighting" column is added to the table shown in FIG. 8, a weight is set to "3" if the reliability level is "2," the weight is set to "1" if the reliability level is "1," and the weight is set to "0" if the reliability level is "0."

Further, the number of nearby vehicles is two, and the own vehicle 100 acquires the position information and the reliability level from each of the two nearby vehicles. Further, the acquired reliability levels of the nearby vehicles are "2" and "1," respectively. In this case, first, the reliability level check unit 62 acquires the respective reply signals from the nearby vehicle position acquisition unit 60. Further, the reliability level check unit 62 reads weighting information corresponding to the reliability levels included in the respective signals from the above table. The reliability level check unit 62 estimates a current position using the position information included in the reply signal. Here, a current position estimated using the position information of which the reliability level is "2" (weight "3") is "A," and the current position estimated using the position information of which the reliability level is "1" (weight "1") is "B." Then, for example, the reliability level check unit 62 may divide a line connecting "A" to "B" in 4 (3+1) using the weighting information, and estimate a point closest to the position "A" among the divided points to be the current position. The point estimated to be a new current position is at a distance of "1:3" from "A" and "B," and is a position reflecting the weights of the reliability levels for the position information estimated by the two nearby vehicles. The reliability level check unit 62 outputs this position information to the nearby vehicle position acquisition unit 60, and the nearby vehicle position acquisition unit 60 stores the estimated position information in the storage unit 80 in place of the position information that the GNSS receiver 21 has received from the satellite.

The above-described own position measurement device has a computer included therein. Each process of the above-described own position measurement device is stored in the form of a program in a computer-readable recording medium, and the above process is performed by the computer reading and executing this program. Here, the computer-readable recording medium refers to a magnetic disk, a magneto-optical disc, a CD-ROM, a DVD-ROM, a semiconductor memory, or the like. Further, this computer program may be distributed to a computer via a communication line, and a computer receiving this distribution may execute the program.

Further, the program may be a program capable of realizing some of the above-described functions. The program may be a program capable of realizing the above-described functions in combination with a program previously stored in the computer system, that is, a so-called differential file (differential program).

In addition, the components in the above embodiment may be appropriately replaced with well-known components without departing from the scope of the present invention. Further, the technical scope of the present invention is not limited to the above embodiments, and various changes can be made without departing from the scope of the present invention. For example, means for acquiring the position information from the nearby vehicle may not be the wireless LAN, and may be another wireless communication means.

INDUSTRIAL APPLICABILITY

According to the position measurement method, the own position measurement device, and the on-board unit, it is possible to measure a position of a vehicle even when a component of an on-board unit fails.

REFERENCE SIGNS LIST

1 Own position measurement device
10 Failure monitoring unit
20 Position detection unit
21 GNSS receiver
22 Acceleration sensor
23 Gyro sensor
24 Orientation sensor
30 Movement amount estimation processing unit
40 Position estimation processing unit
50 Charging processing unit
60 Nearby vehicle position acquisition unit
61 Radio wave intensity and position calculation unit
62 Reliability level check unit
70 Communication unit
71 Mobile phone
72 Wireless LAN
73 DSRC
80 Storage unit
90 IC card reader
100 Own vehicle
200 Other vehicle
301 Position information request signal
302 Reply signal

The invention claimed is:

1. A vehicle position measurement method, comprising:
a process of determining whether or not position information of an own vehicle is able to be acquired with predetermined quality from an outside;
a process of acquiring position information of a nearby vehicle present in an area in which the own vehicle is capable of acquiring information when the position information is determined not to be able to be acquired with the predetermined quality; and
a process of replacing the position information of the own vehicle with the acquired position information of the nearby vehicle,
wherein a determination of the quality is performed according to whether or not there is a communication abnormality in acquisition of the position information from the outside when a quality prediction information, which is added to map information, for an estimated current position of the own vehicle is better than a predetermined reference.

2. The vehicle position measurement method according to claim 1, further comprising:
acquiring a plurality of pieces of position information of the nearby vehicles through communications, and calculating the position information of the own vehicle from the plurality of pieces of acquired position information and received signal strength indicators in the respective communications used for the acquisition.

3. The vehicle position measurement method according to claim 1,
wherein the process of acquiring the position information of the nearby vehicles further includes a process of:
acquiring information indicating reliability of the position information, and
selecting position information having a reliability equal to or higher than that of the own vehicle from the position information of the nearby vehicles when the position information of the own vehicle is determined not to be able to be acquired with the predetermined quality.

4. The vehicle position measurement method according to claim 1,
wherein the process of acquiring the position information of the nearby vehicles further includes a process of:
acquiring information indicating reliability of the position information, and weighting the position information of the own vehicle and the nearby vehicles, calculating the position information, and replacing the position information of the own vehicle with the calculated position information when the position information of the own vehicle is determined not to be able to be acquired with the predetermined quality.

5. The vehicle position measurement method according to claim 1,
wherein a determination of the quality is performed according to whether a position information which is acquired from the outside while the own vehicle is stopped varies or not.

6. An on-board unit comprising an own position measurement device that measures a current position of an own vehicle using the position measurement method according to claim 1.

7. An own position measurement device, comprising:
a failure monitoring unit that determines whether or not position information of an own vehicle is able to be acquired with predetermined quality from an outside;
a nearby vehicle position acquisition unit that acquires position information of a nearby vehicle present in an area in which the own vehicle is capable of acquiring information when the position information is determined not to be able to be acquired with the predetermined quality; and
a position estimation processing unit that estimates the position information of the own vehicle from the acquired position information of the nearby vehicle,
wherein the failure monitoring unit performs a determination of the quality according to whether or not there is a communication abnormality in acquisition of the position information from the outside when a quality prediction information, which is added to map information, for an estimated current position of the own vehicle is better than a predetermined reference.

8. The own vehicle position measurement device according to claim 7,
wherein the nearby vehicle position acquisition unit includes a radio wave intensity and position calculation unit that acquires a plurality of pieces of position information of the nearby vehicles through communications, and calculates the position information of the own vehicle from the plurality of pieces of acquired position information and received signal strength indicators in the respective communications used for the acquisition.

9. The own vehicle position measurement device according to claim 7, further comprising:
a reliability level check unit that acquires information indicating reliability of the position information of the nearby vehicles, and selects position information having a reliability equal to or higher than that of the own vehicle from the position information of the nearby vehicles.

10. The own vehicle position measurement device according to claim 9,
wherein the reliability level check unit acquires a weight according to a reliability level, applies the weight to the position information of the own vehicle and the nearby vehicles, and calculates the position information.

11. The own vehicle position measurement device according to claim 7,
wherein the failure monitoring unit performs a determination of the quality according to whether a position information which is acquired from the outside while the own vehicle is stopped varies or not.

* * * * *